(12) United States Patent
Zhou et al.

(10) Patent No.: US 7,852,906 B2
(45) Date of Patent: Dec. 14, 2010

(54) WIRELESS COMMUNICATION DEVICE AND CHANNEL ESTIMATION AND SEPARATION METHOD IN MULTI INPUT SYSTEM

(75) Inventors: Liang Zhou, Kawasaki (JP); Michiharu Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 664 days.

(21) Appl. No.: 11/898,711

(22) Filed: Sep. 14, 2007

(65) Prior Publication Data
US 2008/0031375 A1 Feb. 7, 2008

(30) Foreign Application Priority Data
Mar. 16, 2005 (WO) ................ PCT/JP2005/004616

(51) Int. Cl.
*H04L 27/30* (2006.01)
(52) U.S. Cl. .............. 375/147; 375/260; 375/340; 370/208; 370/210; 370/465
(58) Field of Classification Search ........... 375/140, 375/141, 147, 260, 267, 340; 370/203, 204, 370/208, 210, 464, 465, 478, 480
See application file for complete search history.

(56) References Cited

U.S. PATENT DOCUMENTS

| | | | |
|---|---|---|---|
| 7,254,196 B2 | 8/2007 | Kriedte et al. | |
| 7,308,033 B2* | 12/2007 | Yu et al. | 375/260 |
| 7,362,832 B2* | 4/2008 | Yoshida | 375/348 |
| 7,440,506 B2* | 10/2008 | Atungsiri et al. | 375/260 |
| 2001/0053143 A1 | 12/2001 | Li et al. | |
| 2003/0108117 A1 | 6/2003 | Ketchum et al. | |
| 2004/0234004 A1 | 11/2004 | Ketchum et al. | |
| 2005/0157683 A1 | 7/2005 | Ylitalo et al. | |
| 2005/0157684 A1 | 7/2005 | Ylitalo et al. | |
| 2005/0163258 A1* | 7/2005 | Gore et al. | 375/340 |

FOREIGN PATENT DOCUMENTS

EP 1 379 020 1/2004

(Continued)

OTHER PUBLICATIONS

Kazunari, Yokomakura, et al., "A study on channel estimation for DPC-OF/TDMAsystems", Technical Report of IEICE, Japan, The Institute of Electronics,Information and Communication Engineers, Jan. 20, 2005.RCS2004-263,vol.104,No. 595, pp. 25-30, including its English abstract.

(Continued)

Primary Examiner—Dac V Ha
(74) Attorney, Agent, or Firm—Hanify & King, P.C.

(57) ABSTRACT

In a wireless communication apparatus of multi-input system, Fourier transform is used to estimate the frequency response of a received signal and further provide a converted impulse response of time domain, and a window function having a simple lowpass filter characteristic is used to separate the impulse response into channel impulse responses of the respective signals. The window function having the lowpass filter characteristic is relatively simple in arithmetic and receives less influence from the channel statistical characteristic, so that it can realize both a separation of multi-antenna channel impulse responses and a highly-precise channel estimation at the same time.

8 Claims, 13 Drawing Sheets

FOREIGN PATENT DOCUMENTS

| | | |
|---|---|---|
| JP | 2002-044051 | 2/2002 |
| JP | 2003-143111 | 5/2003 |
| JP | 2003174429 A | 6/2003 |
| JP | 2004-502376 | 1/2004 |
| JP | 2004-064108 | 2/2004 |
| JP | 2004-180313 | 6/2004 |
| JP | 2004-266814 | 9/2004 |
| JP | 2005-512447 | 4/2005 |

OTHER PUBLICATIONS

Notice of Reason for Rejection dated Dec. 1, 2009 received in corresponding Japanese patent application No. 2007-508059.

G. Auer, "Channel Estimation for OFDM with Cyclic Delay Diversity", Proc. IEEE PIMRC2004, vol. 3. pp. 1792-1796, Sep. 2004.

Y. Li, "Simplified Channel Estimation for OFDM Systems With Multiple Transmit Antennas", IEEE Trans. Wireless Commun., vol. 1, No. 1, pp. 67-75, Jan. 2002.

* cited by examiner

WIRELESS COMMUNICATION DEVICE AND CHANNEL ESTIMATION AND SEPARATION METHOD IN MULTI INPUT SYSTEM

CROSS-REFERENCE TO RELATED APPLICATION

This is a continuation of Application PCT/JP2006/303768, filed on Feb. 28, 2006, now pending, the contents of which are herein wholly incorporated by reference.

BACKGROUND OF THE INVENTION

1. Field of the Present Invention

The present invention relates generally to a wireless communication device and a channel estimation/separation method in a wireless LAN, mobile communications, digital broadcasting, etc that utilize MIMO (Multiple Input Multiple Output)-OFDM (Orthogonal Frequency Division Multiplexing), and more particularly to a wireless communication device and a channel estimation/separation method that are capable of estimating and separating a transfer function of a channel with high accuracy.

2. Description of the Related Art

The MIMO (Multiple Input Multiple Output) system, which is a generic term of multiple-input multiple-output systems, represents a system of transmitting information by use of array antennas for both of transmission and reception in communication fields. The MIMO system is utilized in wireless LANs and in mobile communications at the present and is expected to be applied to broadband wireless communications in the future.

A study of a MIMO-OFDM wireless communication system utilizing the Orthogonal Frequency Division Multiplexing (OFDM), which is a tough scheme against frequency selective fading and has high frequency availability efficiency, shows a progress for handling broadband information signals by the MIMO.

In the MIMO-OFDM wireless communication system, it is required that a channel transfer function be estimated for estimating fluctuations in amplitude and in phase on a subcarrier-by-subcarrier basis, which occur on transmission paths. The channel estimation in the MIMO-OFDM requires measuring a deviation from an idealistic state of the amplitude and the phase on the subcarrier-by-subcarrier basis of a frequency of a pilot symbol of each antenna by using the transmitted pilot symbol (training symbol) and the received signal. If disabled to perform the high-accuracy channel estimation, it is impossible to demodulate reliable data by the MIMO-OFDM system.

Some channel estimation methods are known as the conventional arts. Non-Patent document 1 (Y. Li "Simplified channel estimation for OFDM systems with multiple transmit antennas" (IEEE Trans. Wireless Commun., vol. 1, pp. 67-75, January. 2002)) discloses a technology that needs a large quantity of multiplication and a large amount of IFFT beforehand, resulting in a tremendous quantity of arithmetic operations. Further, Non-Patent document 2 (G. Auer "Channel Estimation for OFDM with Cyclic Delay Diversity" (Proc. IEEE PIMRC 2004, Vol. 3, pp. 1792-1796, Sep. 2004)) discloses a technology capable of improving accuracy of the channel estimation and simultaneously performing the channel separation by using a Wiener filter in a time domain that obtains a minimum mean square error (MMSE). The MMSE filter (Wiener filter) requires a priori statistic characteristic of the channel, however, this characteristic can be obtained also by estimation. Generally, however, the receiving side does not recognize the known statistic characteristic of the channel. The estimation of the statistic characteristic of the channel, which needs calculation of correlation etc, is intricate of the arithmetic operation and is large of the arithmetic quantity. Further, a problem about the estimation accuracy arises if noises and interference are large. It is to be noted that the other conventional arts related to the invention of the present application are disclosed in the Japanese Patent Application Laid-Open Publication No. 2004-180313.

SUMMARY OF THE INVENTION

Under such circumstances, it is an object of the present invention to provide a wireless communication device and a channel estimation and separation method that are capable of channel estimation and channel separation with high accuracy by a simple method in MIMO-OFDM wireless communications.

To accomplish the object, according to the present invention, a wireless communication device in a Multi Input system that receive a plurality of signals transmitted from a plurality of transmitting antennas by a receiving antenna, comprises a channel estimation unit Fourier-transforming the plurality of signals received by the receiving antenna, and estimating a transfer function into which to multiplex transfer functions of respective channels between the individual transmitting antennas on the basis of a pre-given pilot signal, and a channel separating unit inverse-Fourier-transforming the estimated transfer function into an impulse response in a time domain, and separating the transformed impulse response into channel impulse responses of the respective signals by use of a Window function having a low pass filter characteristic, wherein the channel estimation unit estimates the transfer functions of the respective channels by Fourier-transforming the channel impulse response of each of the channels.

Further, to fulfill the object, according to the present invention, a channel estimation and separation method in a Multi Input system, comprises a step of receiving a plurality of signals transmitted from a plurality of transmitting antennas by a receiving antenna, a step of Fourier-transforming the plurality of signals received by the receiving antenna, and estimating a transfer function into which to multiplex transfer functions of respective channels between the individual transmitting antennas on the basis of a pre-given pilot signal, a step of inverse-Fourier-transforming the estimated transfer function into an impulse response in a time domain, and separating the transformed impulse response into channel impulse responses of the respective signals by use of a Window function having a low pass filter characteristic, and a step of estimating the transfer functions of the respective channels by Fourier-transforming the channel impulse response of each of the channels.

In the wireless communication device and the channel estimation and separation method according to the present invention, the plurality of signals to be transmitted are subjected to orthogonal frequency division multiplexing (OFDM) modulation.

Still further, for attaining the object, according to the present invention, a wireless communication device comprises a transforming unit Fourier-transforming the signal received by the receiving antenna into the signal in a frequency domain, a first estimation unit estimating a transfer function into which to multiplex transfer functions related to respective channels between each of the plurality of transmitting antennas and the receiving antenna on the basis of the transformed signal in the frequency domain and of a known pilot signal, an inverse transforming unit inverse-Fouriertransforming the estimated transform function into an impulse response in a time domain, a quality measuring unit measuring a reception quality of the signal received by the receiving antenna, a channel separation unit separating the impulse response into impulse responses of individual channel components by use of a Window function changed over corresponding to the measured reception quality, and a second estimation unit estimating each of the transfer functions related to the respective channels by Fourier-transforming each of the separated impulse responses of the individual channel components.

According to the present invention, the quality measuring unit measures the reception quality of the received signal, and the Window function used by the channel separation unit is changed over corresponding to this reception quality. The reception quality may involve using a signal-to-noise ratio obtained by use of the signal in the frequency domain that is transformed by the transform unit, the known pilot signal and the transfer function estimated by the first estimation unit.

In the channel separation unit, the impulse responses of the individual channel components are separated from the impulse responses multiplexed with the respective channel components by employing the changed-over Window function. The thus-separated impulse responses of the channel components are each eventually Fourier-transformed and are thereby output as the transfer function of each individual channel. The changeover of the Window function may be done by the channel separation unit so that the Rectangular Window function is used if the reception quality is higher than a predetermined threshold value, and the Window function having a low pass filter characteristic is employed if the reception quality is lower than the predetermined threshold value.

Thus, according to the present invention, the impulse responses of the individual channel components are separated by employing, the Window function matching with the characteristic corresponding to the reception quality, whereby the high-accuracy channel estimation can be done in whatever receiving environments.

For example, the Rectangular Window function is used if the reception quality is high (the signal-to-noise ratio is large), and hence it is feasible to reduce a distortion in channel estimation value in the case of using the Window function exhibiting the low pass filter characteristic.

It should be noted that the present invention may also be a method by which a computer realizes any one of the functions described above.

Moreover, the present invention may also be a program that gets any one of the functions to be realized.

The wireless communication device and the channel estimation/separation method according to the present invention enable the channel estimation and the channel separation with the high accuracy by a simpler method. Further, a cost for and power consumption of the wireless communication device in the MIMO system can be thereby reduced.

DESCRIPTION OF THE PREFERRED EMBODIMENTS

An embodiment of the present invention will hereinafter be described with reference to the drawings. Such an embodiment does not, however, limit the technical scope of the present invention.

The present invention, in the case of utilizing cyclic delay preamble in a MIMO-OFDM system, enables simultaneous realization of separation of channel impulse responses of multi antennas and high-accuracy channel estimation, which are simple of calculation and small of influence by a statistic characteristic of cannels, by use of a Window function (window function) exhibiting a low pass filter characteristic that is simple in a time domain in a way that utilizes a characteristic of Fourier transform (which is specifically DFT (Discrete Fourier Transform) or FFT (Fast Fourier Transform).

Figure 1:
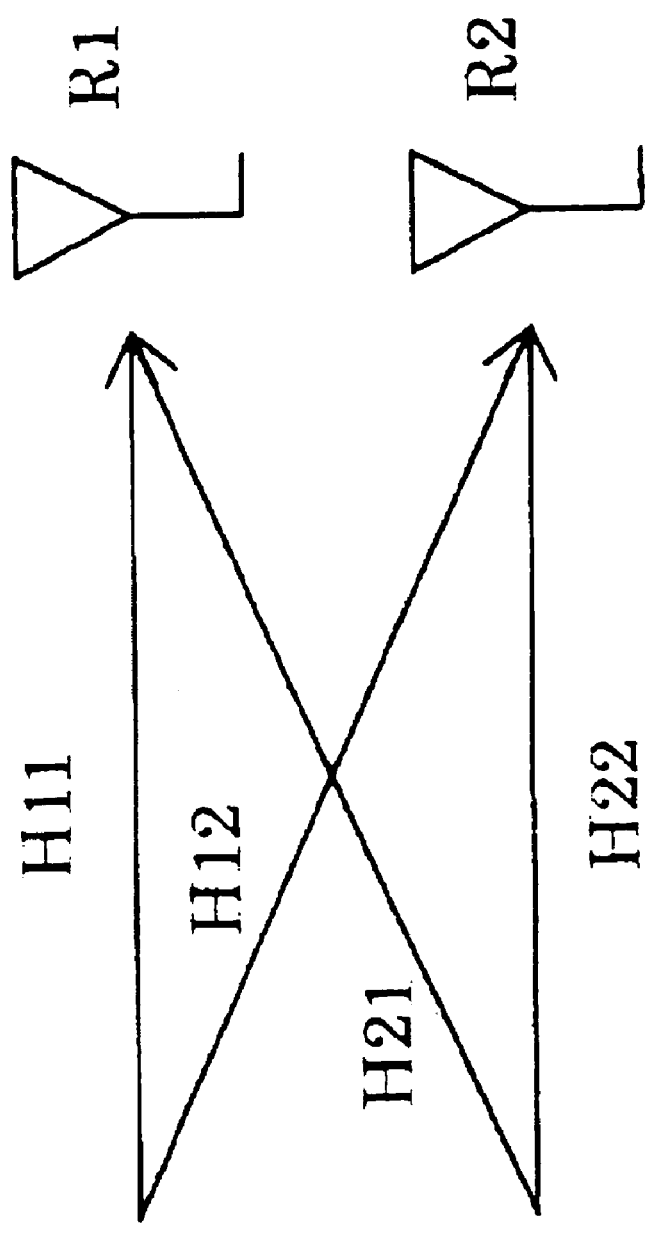
FIG. 1 is a conceptual diagram showing a MIMO system including two transmitting antennas T1, T2 and two receiving antennas R1, R2.

FIG. 1 is a diagram illustrating a concept of a MIMO system including two transmitting antennas T1, T2 and two receiving antennas R1, R2. A configuration in FIG. 1 is that a channel H11 exists between the transmitting antenna T1 and the receiving antenna R1, a channel H21 exists between the transmitting antenna T2 and the receiving antenna R1, a channel H12 exists between the transmitting antenna T1 and the receiving antenna R2, and a channel H22 exists between the transmitting antenna T2 and the receiving antenna R2.

Figure 2:
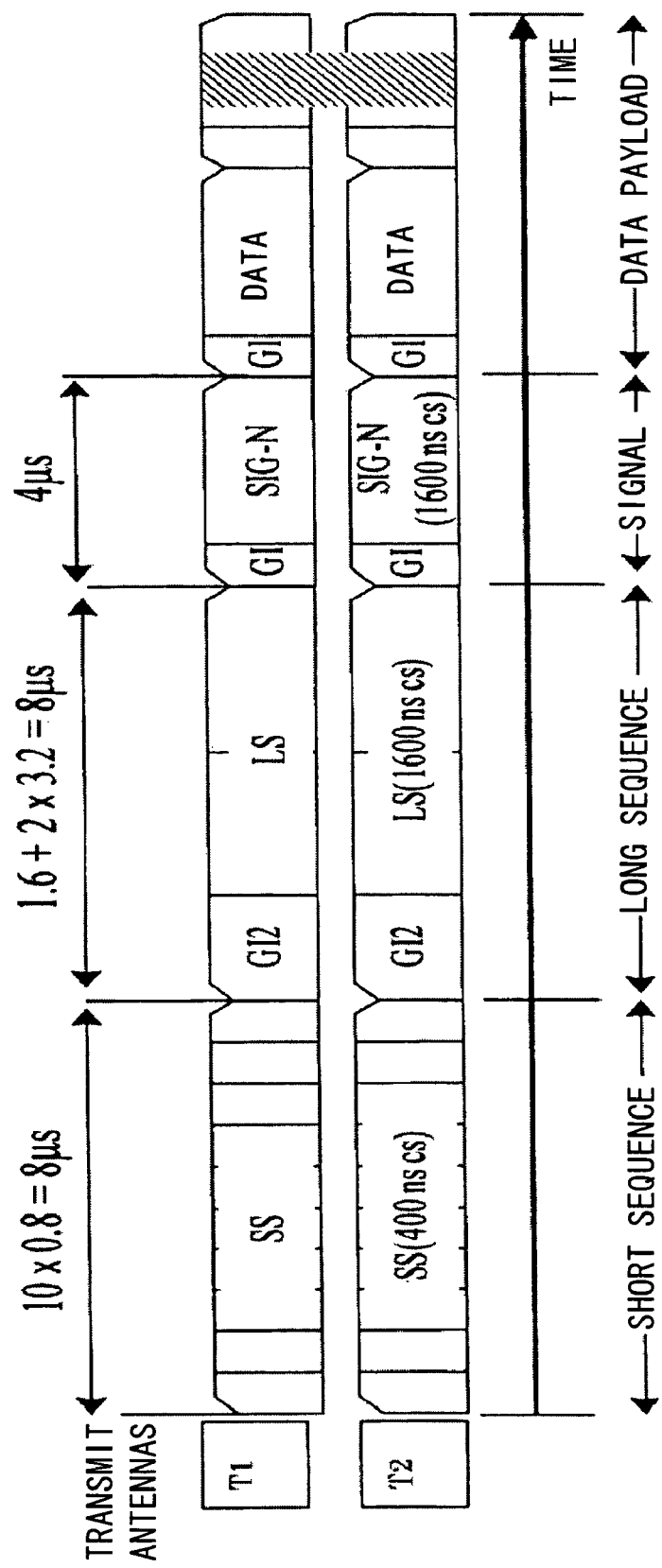
FIG. 2 is a diagram showing a frame format in a MIMO-OFDM system including the two transmitting antennas.

FIG. 2 is a diagram illustrating a frame format in the MIMO-OFDM system including the two transmitting antennas. Short Sequence (SS), Long Sequence (LS) and Signal in each frame format are defined as preambles, and data (Data) is subsequent to the preambles. Guard intervals (GIs) are included in Long Sequence, Signal and Data. The preambles in the frame format of a signal transmitted from one antenna (the transmitting antenna T2 in FIG. 2) are cyclically shifted (CS) to predetermined lengths from the frame format of the transmitting antenna T1 in order to make distinction from the frame format of the signal transmitted from another antenna (the transmitting antenna T1 in FIG. 2).

Figure 3:
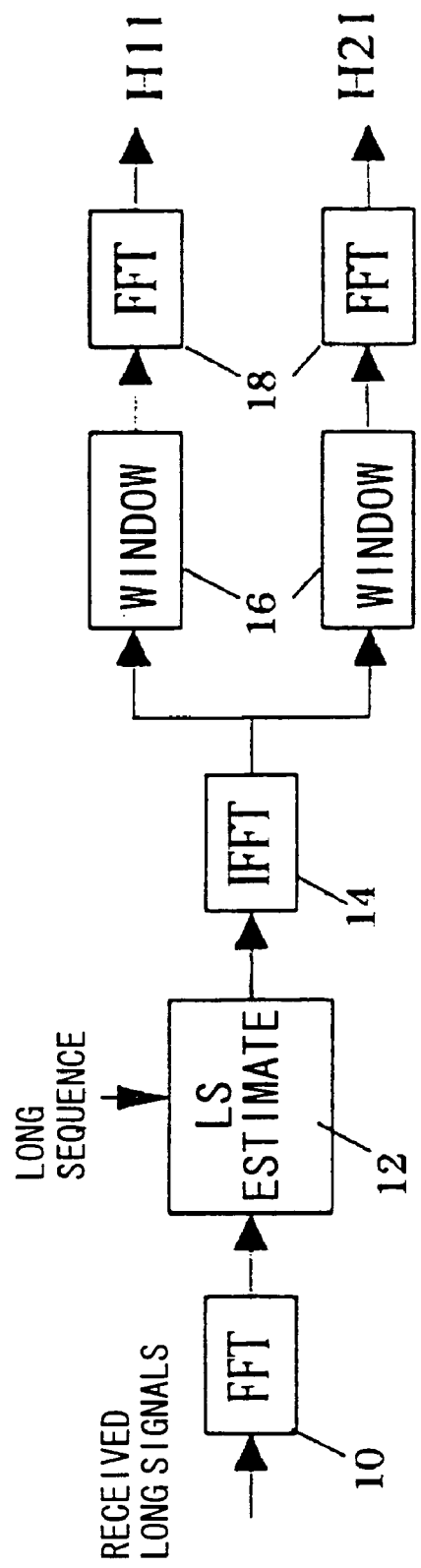
FIG. 3 is an explanatory block configuration diagram illustrating a first channel estimation and separation method in an embodiment of the present invention.

FIG. 3 is an explanatory block configuration diagram illustrating a first channel estimation/separation method in the embodiment of the present invention. To be specific, FIG. 3 is the block diagram of the channel estimation/separation function with respect to the signal received by any one receiving antenna (herein, the receiving antenna R1 is given by way of one example) of the receiving-side wireless communication device in the MIMO-OFDM system having the two transmitting antennas.

To begin with, the receiving antenna R1 receives the signals transmitted from the transmitting antennas T1, T2. The receiving antenna R1 receives the signals from the two transmitting antennas T1, T2 in a signal-mixed state.

A fast Fourier transform (FFT) unit 10 in the receiving-side wireless communication device fast-Fourier-transforms Long sequence of the received signal, and an LS channel estimation (LS Estimate) unit 12 performs channel estimation by use of a least-square (LS) method based on Long sequence given beforehand. Namely, the LS channel estimation (LS Estimate) unit 12 is previously given proper Long sequence as a known pilot signal and performs an arithmetic operation by the least-square method with respect to Long sequence contained in the received signal on the basis of the known pilot signal, thus conducting the channel estimation. In the frequency responses (transfer functions) acquired by this operation, the frequency responses of the channels H11, H21 of the two transmitting antennas T1, T2 and the receiving antenna R1 are overlapped.

Subsequently, an inverse fast Fourier transform (IFFT) unit 14 transforms the frequency responses (which are the transfer functions that the frequency responses of the channels H11, H21 are overlapped) estimated by the LS channel estimation (LS Estimate) unit 12 into impulse responses in a time domain. The impulse responses of the two channels are separated in the time domain through a DFT characteristic or an FFT characteristic. The separation at this stage does not, however, imply perfect separation of the two impulse responses because of the respective impulse responses containing noises etc.

Then, a window function arithmetic unit (Window) 16 further separates the separated impulse responses into impulse responses on a channel-by-channel basis by use of a Window function (window function) having a low pass filter (Low pass filter) characteristic.

The DFT characteristic or the FFT characteristic, because of the multiplication (Window) in the time domain being convolution (filter characteristic) in a frequency domain, enables simultaneous realization of the separation of the channel impulse responses given from the two transmitting antennas and a decrease in noise by using the Window function having the low pass filter characteristic.

The Window function having the low pass filter characteristic is exemplified such as Blackman Window and Hamming Window, which are well known in the signal processing field.

Figure 4:
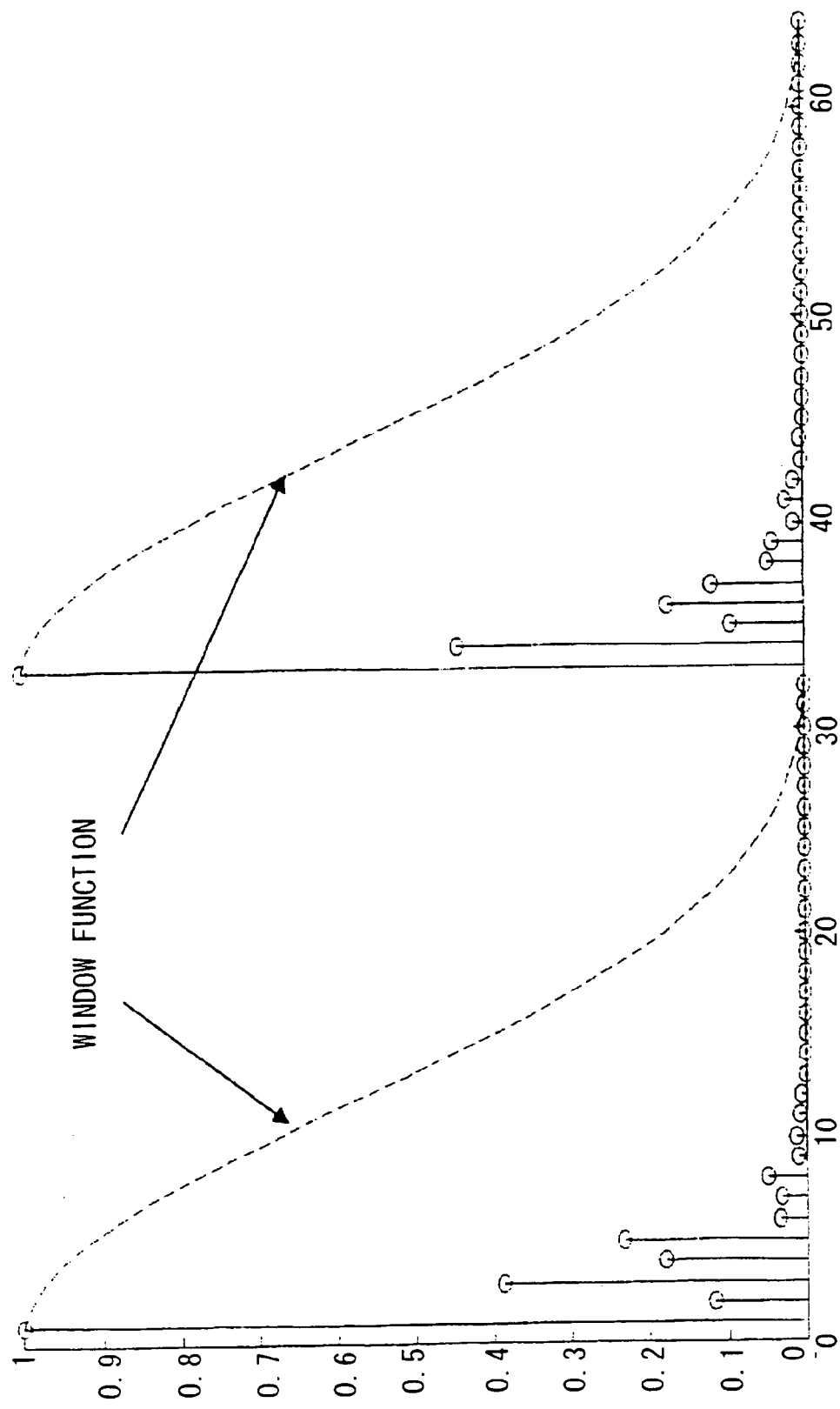
FIG. 4 is an explanatory graph illustrating a channel separation in a time domain.

FIG. 4 is an explanatory graph illustrating the channel separation in the time domain. The axis of abscissa represents time, and the axis of ordinate represents amplitude. As shown in FIG. 4, the channels H11, H21 are separated by the Window function (Blackman Window is given by way of one example) having the low pass filter characteristic.

Then, the two channel impulse responses in the time domain, which are perfectly separated by the Window function (Window) 16, are transformed again into the frequency responses by the fast Fourier transform (FFT) unit 18. The frequency responses (the transfer functions) separated respectively into the two channels can be thereby estimated and further separated. The thus-acquired channel transfer functions are used for channel equalization etc.

Figure 5:
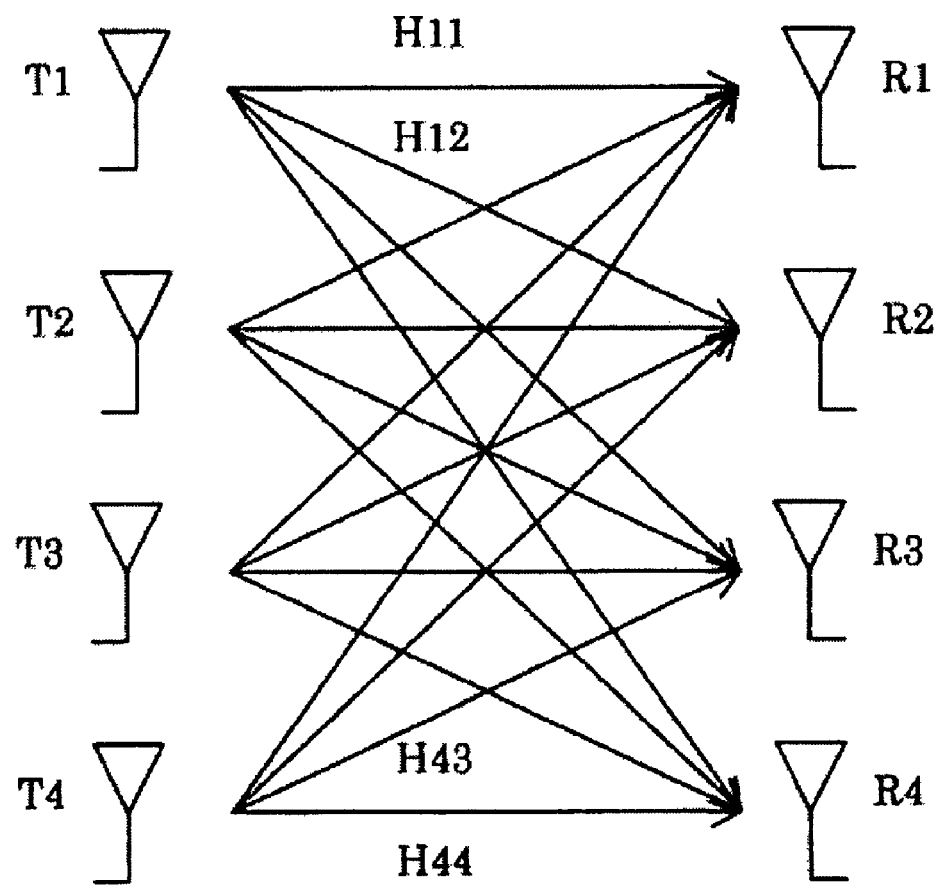
FIG. 5 is a conceptual diagram showing a MIMO system including four transmitting antennas T1, T2, T3, T4 and four receiving antennas R1, R2, R3, R4.

FIG. 5 is a diagram showing a concept of the MIMO system including four transmitting antennas T1, T2, T3, T4 and four receiving antennas R1, R2, R3, R4. A configuration in FIG. 5 is, in the same way as in the configuration in FIG. 1, that sixteen channels H11, H12, . . . , H43, H44 exist between the respective transmitting antennas and the receiving antennas. Note that some of the 16 channels are marked with the reference numerals for the illustration's sake.

Figure 6:
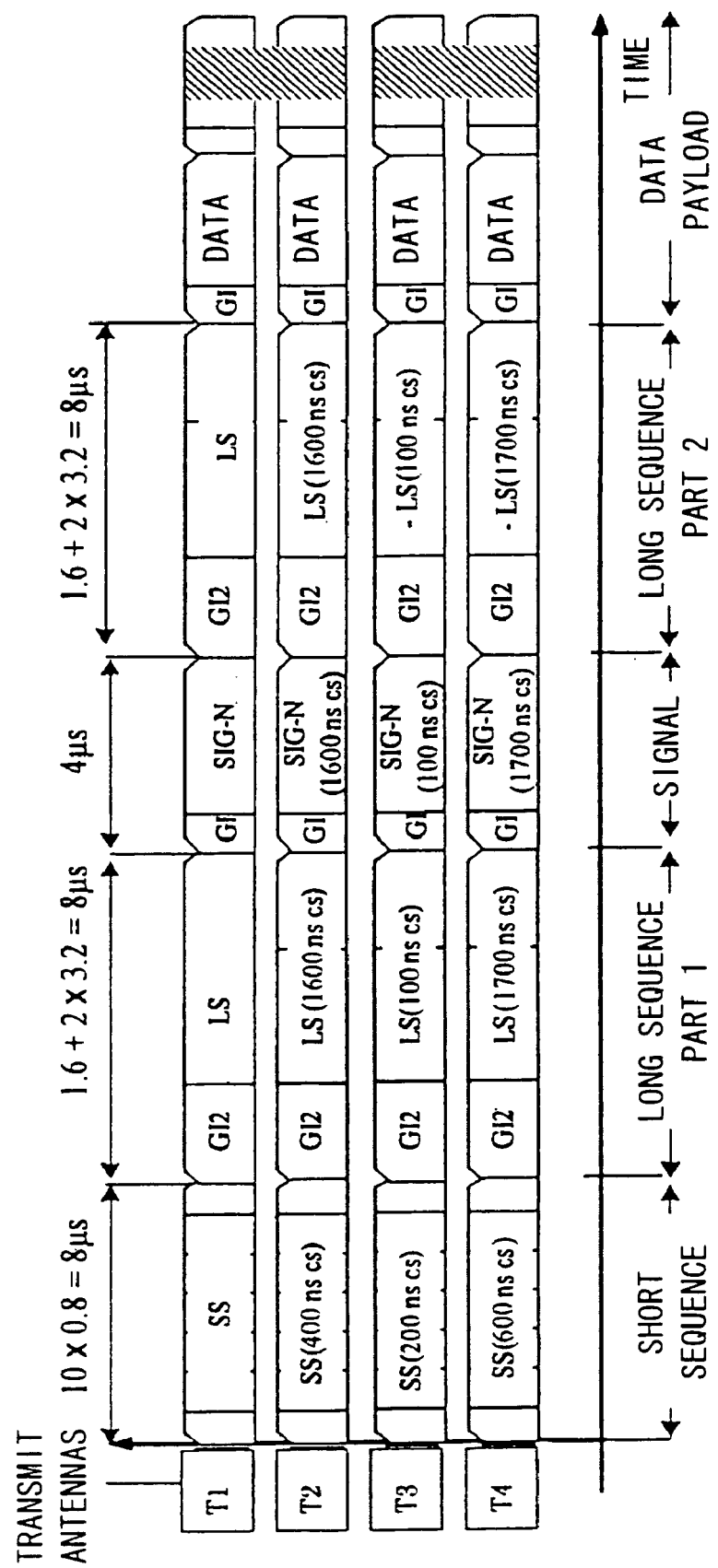
FIG. 6 is a diagram showing frame formats in a MIMO-OFDM system including the four transmitting antennas.

FIG. 6 is a diagram showing frame formats in the MIMO-OFDM system including the four transmitting antennas. Each frame has, as in the case of FIG. 2, preambles containing Short Sequence (SS), Long Sequence (LS) and Signal, and data (Data) is subsequent to the preambles. Guard intervals (GIs) are included in Long Sequence, Signal and Data. Further, the preambles contain two Long sequences (LSs) (Part 1, Part 2) in order to distinguish between the four frame formats, wherein the LSs of the transmitting antennas T2, T3, T4 are cyclically shifted (CS) respectively by 1600 ns, 100 ns, 1700 ns in both of the Part 1 and the Part 2 with respect to the transmitting antenna T1, and further the LSs of the transmitting antennas T3, T4 in the Parts 2 are each prefixed with a minus sign and thus set in an inverted state.

Figure 7:
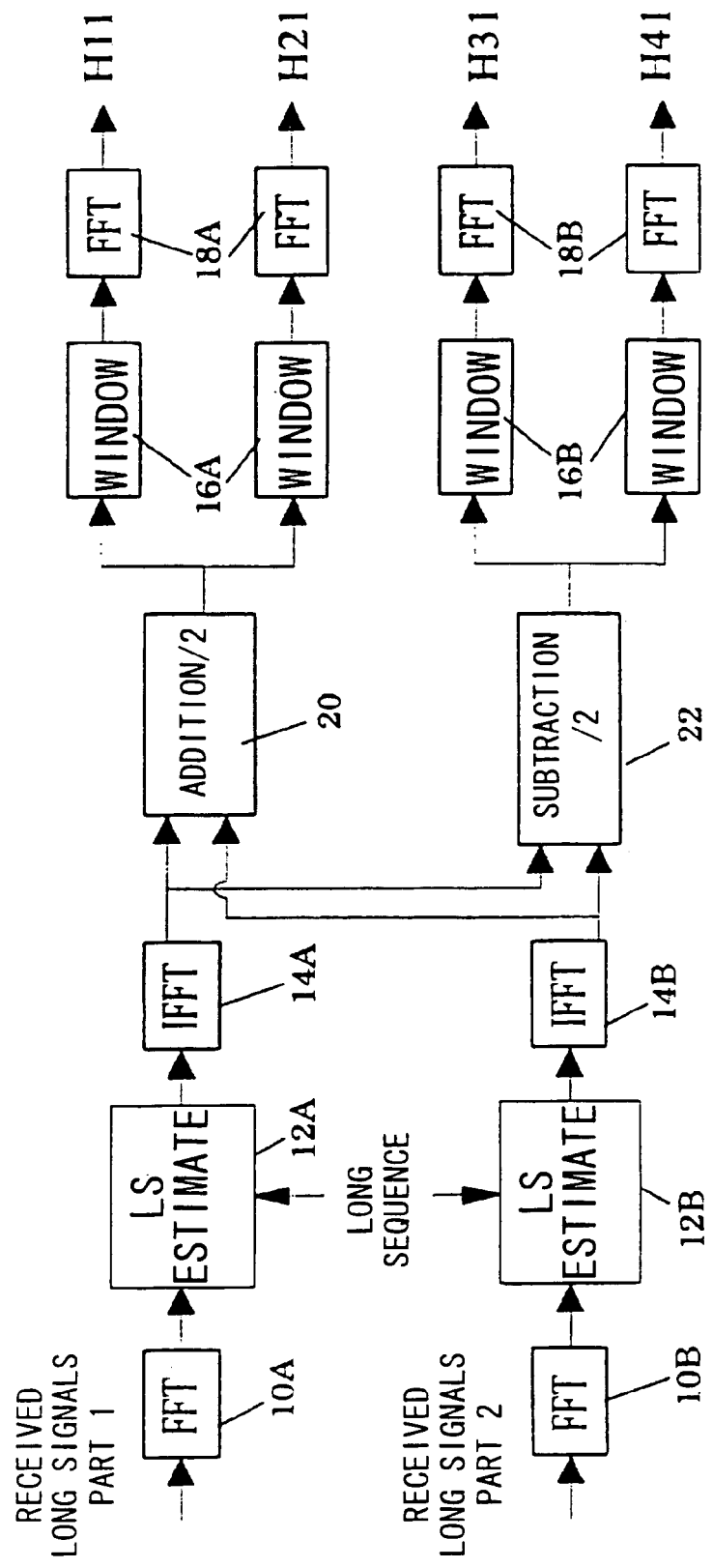
FIG. 7 is an explanatory block configuration diagram illustrating a second channel estimation and separation method in the embodiment of the present invention.

FIG. 7 is an explanatory block configuration diagram illustrating a second channel estimation/separation method in the embodiment of the present invention. Specifically, FIG. 7 is the block diagram of the channel estimation/separation function with respect to the signal received by any one receiving antenna (herein, the receiving antenna R1 is given by way of one example) of the receiving-side wireless communication device in the MIMO-OFDM system having the four transmitting antennas.

At first, the receiving antenna R1 receives the signals transmitted from the transmitting antennas T1, T2, T3, T4. The receiving antenna R1 receives the signals from the four transmitting antennas T1, T2, T3, T4 in the signal-mixed state.

A fast Fourier transform (FFT) unit 10A in the receiving-side wireless communication device fast-Fourier-transforms Long sequence (LS) Part 1 of the received signal, and a fast Fourier transform (FFT) unit 10B fast-Fourier-transforms Long sequence (LS) Part 2 of the received signal. Then, an LS channel estimation (LS Estimate) unit 12A performs the channel estimation by use of the least-square (LS) method based on Long sequence (LS) Part 1 given beforehand, and an LS channel estimation (LS Estimate) unit 12B performs the channel estimation by use of the least-square (LS) method based on Long sequence (LS) Part 2 given beforehand. Similarly to the configuration in FIG. 3, the respective LS channel estimation (LS Estimate) units 12A and 12B are previously given proper Long sequences (LSs) Part 1 and Part 2 as known pilot signals, and perform the arithmetic operation by the least-squares method with respect to Long sequences contained in the received signals on the basis of the known pilot signals, thus conducting the channel estimation. In the frequency responses (transfer functions) acquired by this operation, the frequency responses of the channels H11, H21, H31, H41 between the four transmitting antennas T1, T2, T3, T4 and the receiving antenna R1 are overlapped.

Subsequently, inverse fast Fourier transform (IFFT) units 14A, 14B transform the frequency responses (which are the transfer functions that the frequency responses of the channels H11, H21, H31, H41 are overlapped) estimated by the LS channel estimation (LS Estimate) units 12A, 12B into impulse responses in the time domain. The impulse responses of the four channels are separated in the time domain by the inverse Fourier transform. The separation at this stage does not, however, imply perfect separation of the four impulse responses because of the respective impulse responses containing noises etc.

Outputs from the inverse Fourier transform units 14A, 14B are inputted to an adder (Addition) 20 and a subtracter (Subtraction) 22, respectively. As shown in FIG. 5, Long sequences (LSs) transmitted from the transmitting antennas T3, T4 are reversed to each other in their signs with respect to Part 1 and Part 2. Accordingly, components of the channels H31, H41 between the transmitting antennas T3, T4 are erased by adding the outputs from the inverse fast Fourier transform (IFFT) units 14A, 14B, and the impulse responses containing the channel components H11, H21 between the transmitting antennas T1, T2 are output from the adder (Addition) 20. Note that the two outputs from the inverse fast Fourier transform (IFFT) units 14A, 14B are added up, and hence a total value given from the adder (Addition) 20 is divided by 2 and is thus output.

While on the other hand, as illustrated in FIG. 6, Long sequences (LSs) transmitted from the transmitting antennas T1, T2 are the same in their signs with respect to Part 1 and Part 2. Therefore, components of the channels H11, H21 between the transmitting antennas T1, T2 are erased by subtracting the outputs given from the inverse fast Fourier transform (IFFT) units 14A, 14B, and the impulse responses containing the channel components H31, H41 between the transmitting antennas T3, T4 are output from the subtracter (Subtraction) 22. Note that also in the subtracter (Subtraction) 22, the two outputs from the inverse fast Fourier transform (IFFT) units 14A, 14B are added up, and hence a total value given from the subtracter (Subtraction) 20 is divided by 2 and is thus output.

Then, the Window function arithmetic (Window) units 16A, 16B further separate the separated impulse responses into impulse responses on the channel-by-channel basis by use of the Window functions (window functions) each having the low pass filter (Low pass filter) characteristic. More specifically, the Window function arithmetic (Window) unit 16A separates the impulse responses of the channels H11, H21 that are contained in the output from the adder (Addition) 20, and the Window function arithmetic (Window) unit 16B separates the impulse responses of the channels H31, H41 that are contained in the output from the subtracter (Subtraction) 22.

In the same way as by the first embodiment discussed above, the FFT characteristic, because of the multiplication (Window) in the time domain being the convolution (filter characteristic) in the frequency domain, enables the simultaneous realization of the separation of the channel impulse responses given from the two transmitting antennas and the decrease in noise by employing the Window function having the low pass filter characteristic. The window function having the low pass filter characteristic is exemplified such as Blackman Window and Hamming Window.

The four channel impulse responses in the time domain, which are perfectly separated by the Window functions (Windows) 16A, 16B, are transformed again into the frequency responses by the fast Fourier transform (FFT) units 18A, 18B. The frequency responses (the transfer functions) separated respectively into the four channels can be thereby estimated and further separated.

Figure 8:
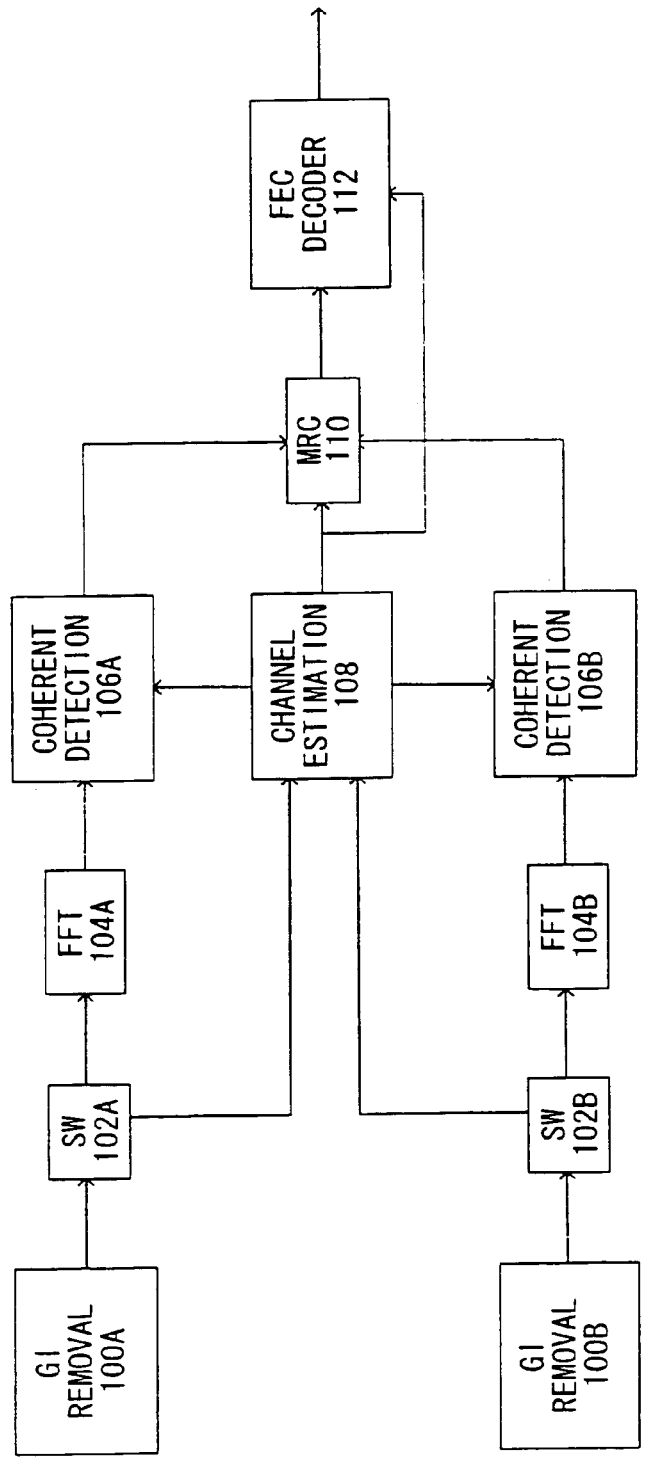
FIG. 8 is a schematic block diagram of a receiving-side wireless communication device in the MIMO system.

FIG. 8 is a schematic block diagram of the receiving-side wireless communication device in the MIMO system. FIG. 8 illustrates a configuration of the wireless communication device including the two receiving antennas by way one example. The guard intervals (GIs) are removed from the signals received by the respective receiving antennas by guard interval removing (GI Removal) units 100A, 100B. Switches (SWs) 102A, 102B perform switching so as to distinguish between Long sequences (LSs) and other elements of the received signals, and output Long sequences (LSs) to the channel estimation unit 108 and other elements to the fast Fourier transform (FFT) units 104A, 104B.

The channel estimation (Channel Estimation) unit 108 has the configuration illustrated in FIG. 3 or FIG. 7, and carries out the channel estimation and the channel separation based on pre-given Long sequences (LSs) with respect to Long sequences (LSs) of the received signals.

Coherent detecting units 106A, 106B obtain original transmission signals corresponding to the signals received by the receiving antennas by use of the transfer functions acquired by the channel estimation unit 108 with respect to the outputs from the fast Fourier transform (FFT) units 104A, 104B. Then, outputs from the coherent detecting (Coherent Detection) units 106A, 106B are inputted to a maximum ratio combining (Maximum Ratio Combining) unit 110 and undergo weighted combination corresponding to receiving electric power, i.e., undergo the maximum ratio combination.

Then, the signals are subjected to error correction decoding in an FEC (Forward Error Correction) decoding (FEC Decoder) unit 112, whereby a data sequence of the transmission signals is regenerated. The decoding in the FEC decoding (FEC Decoder) unit 112 involves using, e.g., Viterbi decoding. Path metric in the Viterbi decoding may be weighted based on the frequency response of each channel.

In the first and second channel estimation/separation methods according to the embodiment discussed above, the Window function arithmetic (Window) units 16, 16A, 16B further separate the separated impulse responses into the impulse responses on the channel-by-channel basis by use of the Window functions having the low pass filter (Low pass filter) characteristic such as Blackman Window and Hamming Window. In a third channel estimation/separation method that will hereinafter be described, the window functions utilized by the Window function arithmetic (Window) units 16, 16A, 16B are changed over corresponding to a signal-to-noise ratio (which will hereinafter be abbreviated to SNR (Signal Noise Ratio)).

Figure 10:
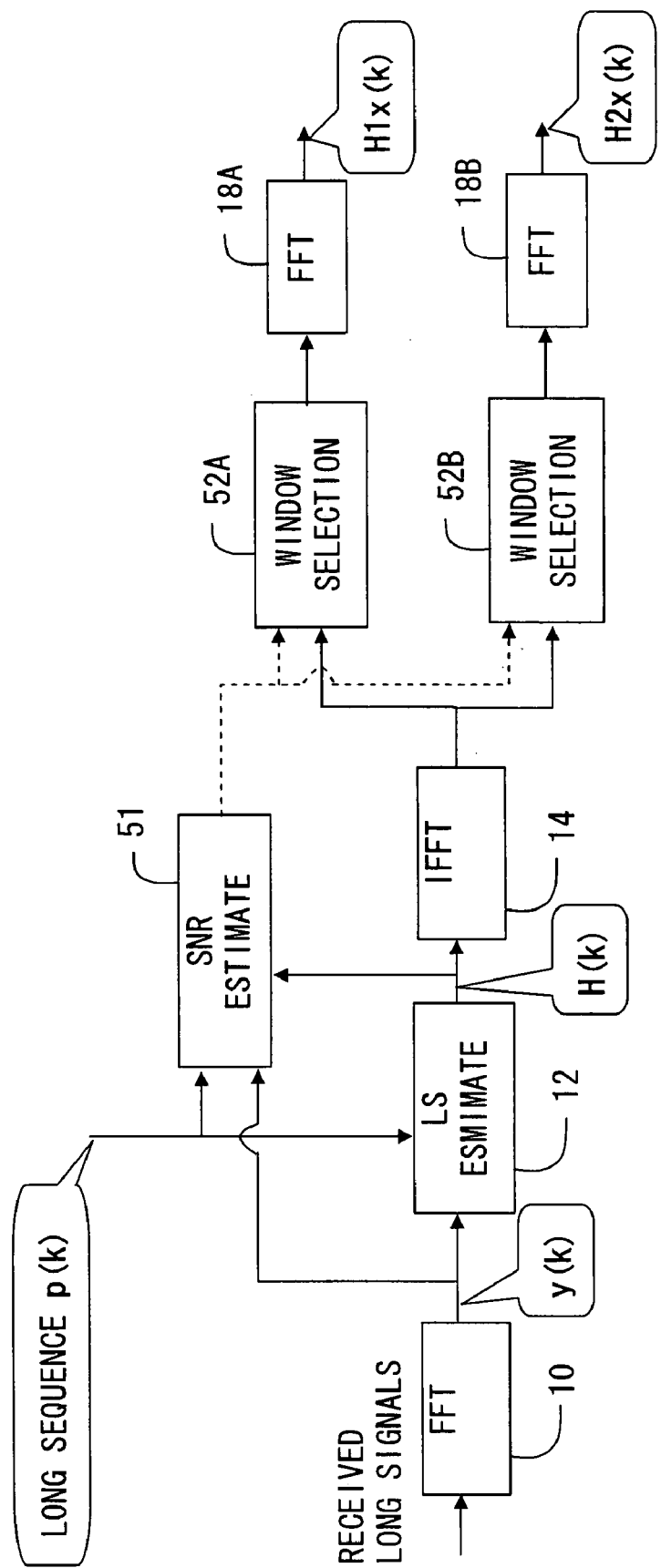
FIG. 10 is a block diagram illustrating a whole configuration of function units that actualize a third channel estimation and separation method according to the embodiment of the present invention.

The third channel estimation/separation method according to the embodiment of the present invention will hereinafter be described with reference to FIG. 10. FIG. 10 is a block diagram illustrating a whole configuration of function units that actualize the third channel estimation/separation method according to the embodiment of the present invention. The following discussion will exemplify the receiving-side wireless communication device in the MIMO-OFDM system including the two transmitting antennas (see FIG. 1). FIG. 10 illustrates the respective function units (circuit units) each taking the third channel estimation/separation function with respect to the signal received by any one receiving antenna (herein, the receiving antenna R1 is given by way of one example) of the receiving-side wireless communication device. The function units realizing the third channel estimation/separation method are the same as those in the first and second methods except that an SNR estimation unit 51 (corresponding to a quality measuring unit according to the present invention) is newly provided, and Window function selection/arithmetic (Window Selection) units 52A, 52B (corresponding to a channel separation unit according to the present invention) are provided in place of the Window function arithmetic unit 16. It should be noted that the fast Fourier transform unit 10 corresponds to a transforming unit according to the present invention, the LS channel estimation unit 12 corresponds to a first estimation unit according to the present invention, the inverse fast Fourier transform unit 14 corresponds to inverse transforming unit according to the present invention, and fast Fourier transform units 18, 18A, 18B correspond to a second estimation unit according to the present invention.

The receiving antenna R1 receives the signals intermixed with the signal transmitted from the two transmitting antennas T1, T2 of the transmitting-side wireless communication device, and Long sequences (see FIG. 2) (which will hereinafter be referred to LS signals) in the received signals are inputted to the fast Fourier transform unit 10. The fast Fourier transform unit 10 transforms the inputted LS signals into the signals in the frequency domain by the FFT or the DFT. At this time, the transformed signals can be separated into signal components corresponding to individual subcarriers. The LS signals (each designated by y(k) shown in FIG. 10, where k represents a subcarrier index) corresponding to individual subcarrier are inputted to the SNR estimation unit 51 and to the LS channel estimation unit 12, respectively.

The LS channel estimation unit 12 previously retains the LS signal becoming a source of the LS signal transferred from the fast Fourier transform unit 10, i.e., the same LS signal as the LS signal transmitted by the transmitting-side wireless communication device with respect to each of the subcarriers (p(k) shown in FIG. 10). This source LS signal is previously retained as, e.g., the known pilot signal. The LS channel estimation unit 12 calculates, by the least-square (Least Square (LS)) method, the LS signal y(k) corresponding to each of the subcarriers output from the fast Fourier transform unit 10 on the basis of the pre-retained LS signal p(k), thereby conducting the channel estimation. The thus-acquired frequency response (transfer function) (H(k) illustrated in FIG. 10) of each subcarrier has such a state that the frequency responses of the channels H11 and H21 between the two transmitting antennas T1, T2 and the receiving antenna R1 are overlapped. The frequency response H(k) is transferred to the inverse fast Fourier transform (IFFT) unit 14 and to the SNR estimation unit 51.

The signal-to-noise ratio (SNR) estimation unit 51, in the same way as the LS channel estimation unit 12 does, previously retains the LS signal p(k) as the known signal. The SNR estimation unit 51 calculates the SNR based on the retained LS signal p(k), the LS signal y(k) output from the fast Fourier transform unit 10 and the frequency response H(k) output from the LS channel estimation unit 12. The SNR calculation method by the SNR estimation unit 51 is described in the following formula (1). "K" in the formula (1) represents an in-use subcarrier count. The calculated SNR are inputted to the Window function selection/arithmetic (Window Selection) units 52A, 52B, respectively.

[Mathematical Expression 1]

$$SNR = \frac{\sum_{k=1}^{K} |H(k)p(k)|^2}{\sum_{k=1}^{K} |y(k) - H(k)p(k)|^2} \quad \text{Formula (1)}$$

The inverse fast Fourier transform (IFFT) unit 14 transforms the frequency responses (the transfer functions into which the frequency responses of the channels H11 and H21 are overlapped) about the respective subcarriers, which are transferred from the LS channel estimation unit 12, into the signals (impulse responses) in the time domain by the IFFT or the IDFT. The thus-transferred impulse responses are inputted to the Window function selection/arithmetic (Window Selection) units 52A, 52B, individually.

Note that the impulse responses at this point of time can be separated into the two channel components through the DFT characteristic or the FFT characteristic. At this time, however, the impulse responses of the individual channels contain the noise components etc and can not be therefore perfectly separated. Hence, the subsequent processes are executed by the Window function selection/arithmetic units 52A, 52B in order to attain the perfect separation into the impulse responses on the channel-by-channel basis.

The window function selection/arithmetic units 52A, 52B multiply each of the channel impulse responses about the respective subcarriers received from the inverse fast Fourier transform unit 14 by a predetermined Window function (Window function). At this time, the Window function selection/arithmetic units 52A, 52B select the should-multiply Window function on the basis of the SNR received from the SNR estimation unit 51. Specifically, the Window function selection/arithmetic units 52A, 52B retain an SNR threshold value (e.g., 30 decibels (dB)), determine whether the SNR received from the SNR estimation unit 51 is larger than the SNR threshold value, then select a rectangular window (Rectangular Window) if larger than the SNR threshold value, and select the Window function having the low pass filter (Low pass filter) characteristic such as Blackman Window and Hamming Window if smaller than the SNR threshold value.

Generally, it is known that the Rectangular Window is excellent in terms of frequency resolution of the main components, while Hamming Window etc is excellent of the frequency resolution of small signal components slightly away from the main components. The Window function selection/arithmetic units 52A, 52B select the Window function matching with the impulse response of the received signal at that time, corresponding to the characteristics of these Window functions.

The multiplication (Window) in the time domain, which is executed by the Window function selection/arithmetic units 52A, 52B, is the convolution (filter characteristic) in the frequency domain, and hence the window function selection/arithmetic units 52A, 52B simultaneously actualize the perfect separation of the channel impulse responses from the two transmitting antennas and the decrease in noise. The Window function selection/arithmetic unit 52A separates the first channel component from the channel impulse responses related to the individual subcarriers received from the inverse fast Fourier transform unit 14, while the Window function selection/arithmetic unit 52B separates the second channel component from the channel impulse responses related to the same individual subcarriers.

Figure 11:
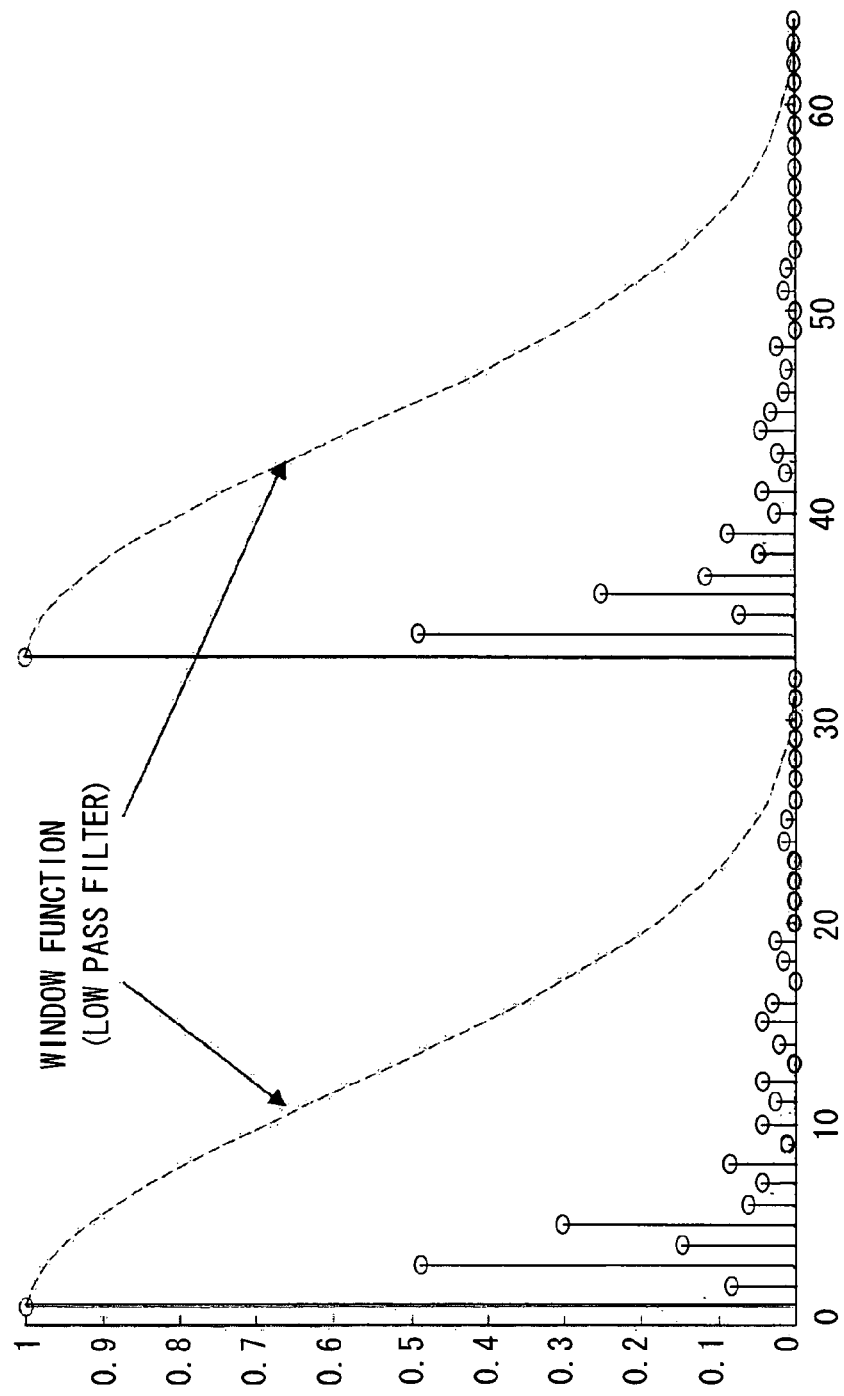
FIG. 11 is an explanatory diagram of the channel separation when an SNR is small in the third method.
Figure 12:
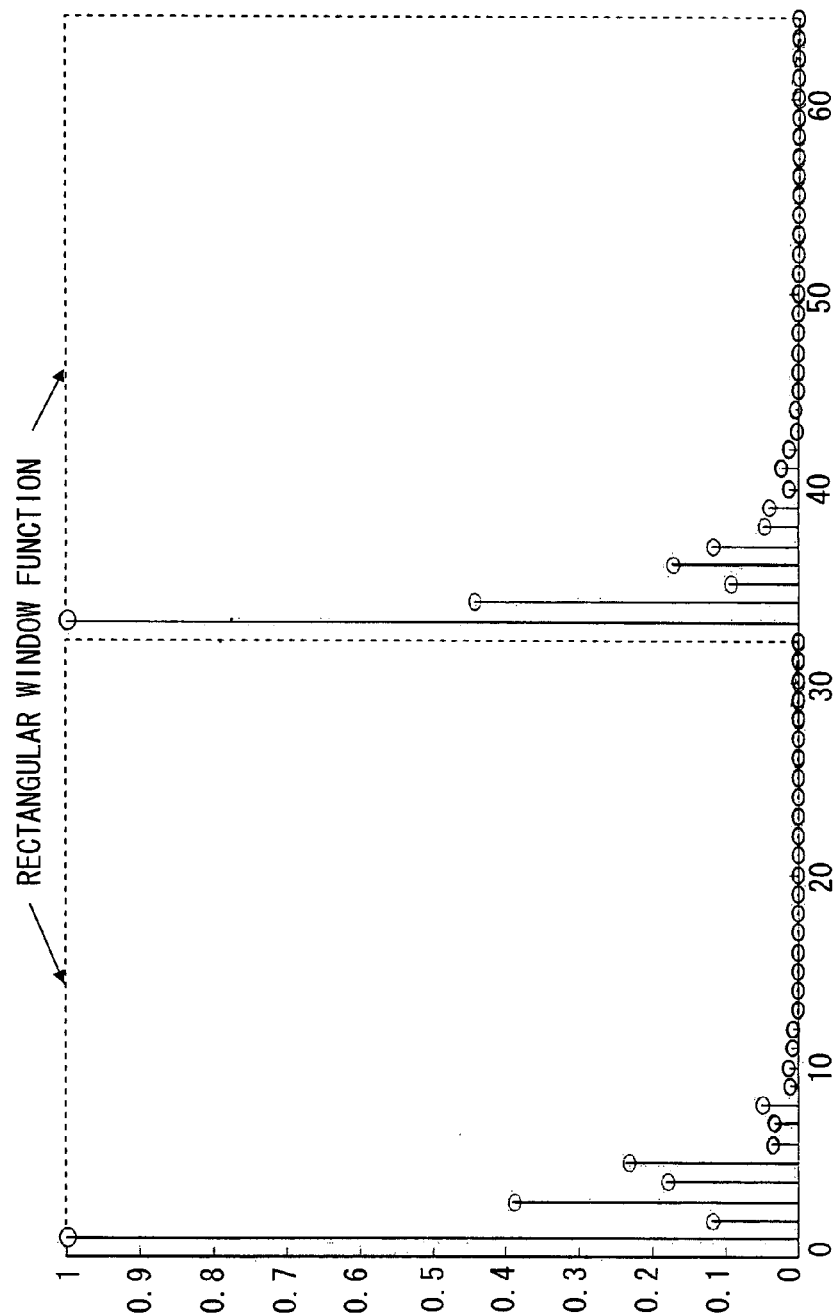
FIG. 12 is an explanatory diagram of the channel separation when the SNR is large in the third method.

FIG. 11 is an explanatory diagram of the channel separation when the SNR is small in the third method. FIG. 12 is an explanatory diagram of the channel separation when the SNR is large in the third method. In both of FIGS. 11 and 12, the axis of abscissa represents the time (sample), and the axis of ordinate represents the amplitude.

The Window function selection/arithmetic units 52A, 52B, when determining that the SNR received from the SNR estimation unit 51 is smaller than the SNR threshold value, as illustrated in FIG. 11, multiply the channel impulse response received from the inverse fast Fourier transform unit 14 by the Window function having the low pass filter characteristic, thereby separating the channel component H11 and the channel component H21 of the channel impulse response. On the other hand, the Window function selection/arithmetic units 52A, 52B, when determining that the SNR received from the SNR estimation unit 51 is larger than the SNR threshold value, as illustrated in FIG. 12, multiply the channel impulse response received from the inverse fast Fourier transform unit 14 by the Rectangular Window function, thereby separating the channel component H11 and the channel component H21. The separated channel components of the channel impulse responses related to the respective subcarriers are inputted to the fast Fourier transform (FFT) units 18A and 18B.

Note that at this time, a sample width of the Window function as the multiplier is determined based on the frame format shown in FIG. 2, and therefore the Window function selection/arithmetic unit 52 may previously retain and may employ information on the sample width conforming with the frame format to be used. Similarly, a start position of the Window function for separating the second channel information (the sample shown on the right side in FIGS. 11 and 12) may also be previously retained. In the example of the frame format illustrated in FIG. 2, the cyclic shift of Long Sequence of the transmitting antenna T2 is determined to be 1600 nanoseconds (ns), and hence, if a sampling interval is set to 20 mega Hertz (MHz), the sample width is determined to be "32". With this setting, in the case of utilizing the Rectangular Window illustrated in FIG. 12, the Window function selection/arithmetic unit 52A multiplies the channel impulse response by the Rectangular Window function with the sample width ranging from a sample 1 to a sample 32, and the Window function selection/arithmetic unit 52B multiplies the channel impulse response by the Rectangular Window function with the sample width ranging from a sample 33 to a sample 64.

The fast Fourier transform units 18A and 18B receive two pieces of perfectly separated channel impulse responses in the time domain by the Window function selection/arithmetic units 52A and 52B, and transform the channel impulse responses into the frequency responses (H1x(k) and H2x(k) shown in FIG. 10, where x represents a receiving antenna index) of the respective channels about the subcarriers through the FFT or the DFT. The frequency responses (transfer functions) of the individual channels related to the subcarriers, which have thus been estimated and separated, are utilized by other function units such as a channel equalization unit.

As described above, according to the third channel estimation/separation method, the SNR estimation unit 51 calculates the SNR on the basis of the known LS signal p(k), the LS signal y(k) output from the fast Fourier transform unit 10 and the frequency response H(k) output from the LS channel estimation unit 12. Then, each of the Window function selection/arithmetic units 52A, 52B selects, based on the relation between the SNR and the SNR threshold value, the Window function by which the channel impulse response, into which LS signal y(k) has been transformed by the inverse fast Fourier transform unit 14, should be multiplied. The Rectangular Window is selected if the SNR is larger than the SNR threshold value, and the Window function having the low pass filter characteristic is selected if the SNR is smaller than the SNR threshold value. The channel impulse responses are multiplied by the selected Window function, then separated into the channel components contained therein and retransformed into the frequency responses of the individual channels in the fast Fourier transform units 18A, 18B.

Thus, the third channel estimation/separation method enables, if the SNR is small, the noises to be decreased by the low pass filter window such as Blackman Window and also enables, if the SNR is large, a reduction in distortion of the channel estimated value in the case of using the low pass filter window by employing the Rectangular window, whereby the channel estimation with high accuracy can be conducted in whatever receiving environments. Further, the present method is effective also in a communication system where spatial interleaving is carried out.

Figure 13:
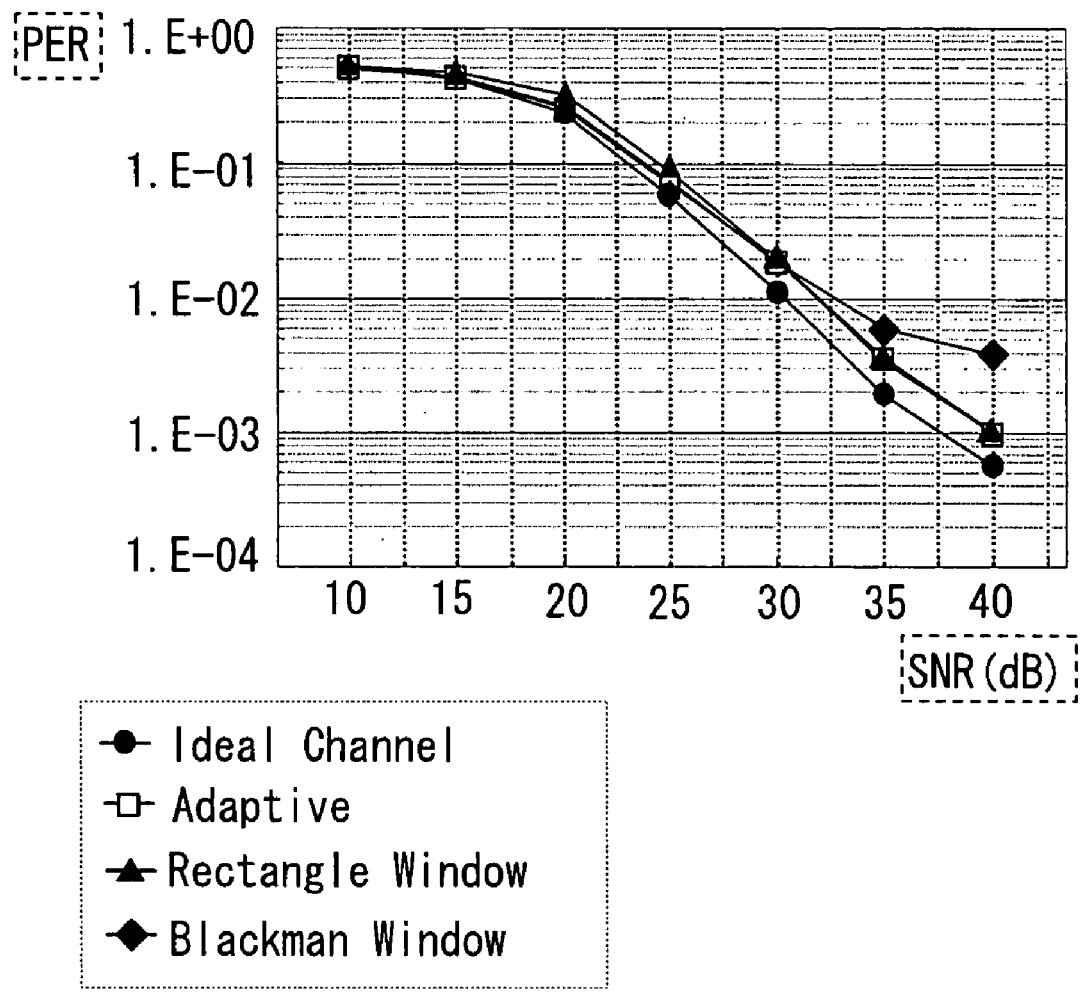
FIG. 13 is a graph showing a result of simulation of each of the channel estimation and separation methods in the present embodiment.

FIG. 13 is a graph showing a result of simulation of each of the channel estimation/separation methods in the present embodiment. In FIG. 13, the axis of abscissa represents the SNR, and the axis of ordinate represents a packet error rate (PER). This simulation employs four models that are given below as shown in a list of symbols in FIG. 13. [Ideal Channel] represents an computational ideal value in terms of calculation, [Adaptive] indicates a third method, [Rectangular Window] represents a case of using the Rectangular Window, and [Blackman Window] represents a case of using the Window function having the low pass filter characteristic corresponding to the first and second methods.

The simulation result in FIG. 13 shows that performance of the Rectangular Window is to decline if the SNR is small and that the decline of the performance of the Blackman Window occurs if the SNR is large. It is recognized that the best performance can be taken in whatever states if using the SNR-based selection of the Window function as by the third method [Adaptive].

Note that the example of the third channel estimation/separation method has exemplified the receiving-side wireless communication device in the MIMO-OFDM system including the two transmitting antennas, however, the scheme is, as a matter of course, flexible to the system (see FIG. 5) having the four transmitting antennas and the four receiving antennas just like the first method and the second method. In this case, the SNRs are calculated with respect to Long Sequence Part 1 and Long Sequence Part 2, and the Window functions may be selected and calculated about the LSs on the basis of the calculated SNRs. Further, the scheme in the example given above is that the two types of Window functions (the Rectangular Window function and the Window function having the low pass filter characteristic) are changed over, however, two or more types of Window functions may also be changed over corresponding to the characteristics. Further, with respect to Long Sequences, the number of the subcarriers to be used may be equalized to the number of IFFTs.

The discussion on the embodiment has been made in a way that exemplifies Long Sequence (LS) of the preambles as the known information (the pilot signal) previously given for the channel estimation process, however, the pilot signal may be, without being limited to the Long Sequence (LS), given as, e.g., an intra-DATA subcarrier. Moreover, when the start position of the FFT WINDOW is within the GI, the impulse response of each channel is extracted by shifting rightward the Window in the time domain.

Figure 9:
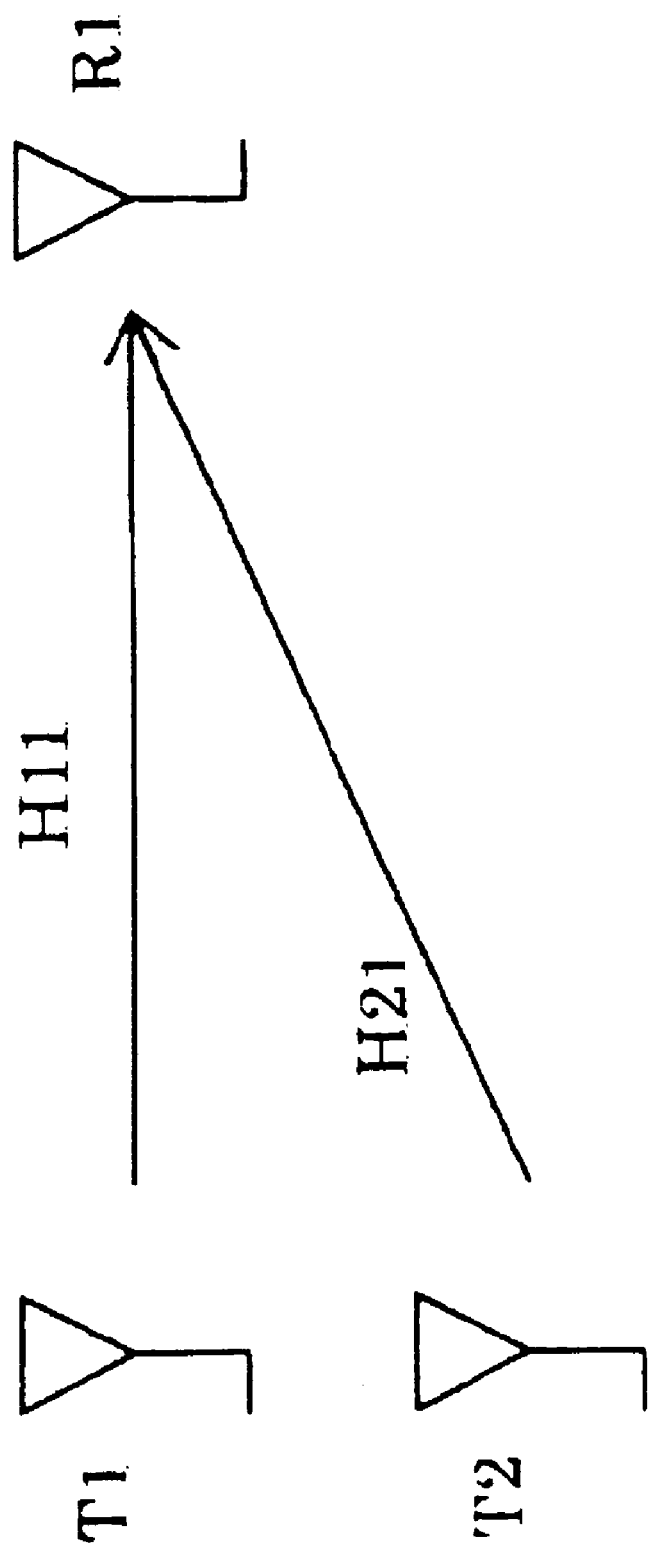
FIG. 9 is a conceptual diagram illustrating a MISO (Multiple Input Single Output) system including the two transmitting antennas T1, T2 and the single receiving antenna R1.

The MIMO system according to the embodiment discussed above has been described as the MIMO-OFDM wireless communication system and may also be applied to an embodiment (FIG. 9) of a Multi Input Single Output (MISO)-OFDM wireless communication system. Furthermore, the modulation method may also include, without being limited to the OFDM, normal FDM (Frequency Division Multiplexing) and other applicable modulation methods.

INDUSTRIAL APPLICABILITY

The wireless communication device according to the present invention is utilized for the Multi Input system applicable to the wireless LAN and the mobile communications, and is capable of performing the high-accuracy channel estimation and separation with the comparatively simple calculation by employing the Window function exhibiting the low pass filter characteristic and the Rectangular Window function.

What is claimed is:

1. A wireless communication device in a Multi Input system including a receiving antenna receiving a plurality of signals transmitted from a plurality of transmitting antennas, comprising:

a channel estimation unit Fourier-transforming the plurality of signals received by the receiving antenna, and estimating a transfer function into which to multiplex transfer functions of respective channels between each of the plurality of transmitting antennas on the basis of a pre-given pilot signal; and a channel separating unit inverse-Fourier-transforming the estimated transfer function into an impulse response in a time domain, and separating the transformed impulse response into channel impulse responses of the respective signals by use of a Window function having a low pass filter characteristic, wherein said channel estimation unit estimates the transfer functions of the respective channels by Fourier-transforming the respective channel impulse responses.

2. A wireless communication device according to claim 1, wherein the plurality of signals to be transmitted is subjected to orthogonal frequency division multiplexing modulation.

3. A channel estimation and separation method in a Multi Input system, comprising the steps of:

receiving a plurality of signals transmitted from a plurality of transmitting antennas by a receiving antenna;

Fourier-transforming the plurality of signals received by the receiving antenna, and estimating a transfer function into which to multiplex transfer functions of respective channels between each of the plurality of transmitting antennas on the basis of a pre-given pilot signal;

inverse-Fourier-transforming the estimated transfer function into an impulse response in a time domain, and separating the transformed impulse response into channel impulse responses of the respective signals by use of a Window function having a low pass filter characteristic; and estimating the transfer functions of the respective channels by Fourier-transforming the respective channel impulse responses.

4. A channel estimation/separation method according to claim 3, wherein the plurality of signals to be transmitted are subjected to orthogonal frequency division multiplexing modulation.

5. A wireless communication device including a receiving antenna receiving a plurality of signals transmitted from a plurality of transmitting antennas, comprising:

a transforming unit Fourier-transforming the plurality of signals received by the receiving antenna into signals in a frequency domain;

a first estimation unit estimating a transfer function into which to multiplex transfer functions related to respective channels between each of the plurality of transmitting antennas and the receiving antenna on the basis of the transformed signals in the frequency domain and of a known pilot signal;

an inverse transforming unit inverse-Fourier-transforming the estimated transform function into an impulse response in a time domain;

a quality measuring unit measuring a reception quality of the plurality of signals received by the receiving antenna;

a channel separation unit separating the impulse response into impulse responses of individual channel components by use of a Window function changed over corresponding to the measured reception quality; and a second estimation unit estimating the transfer functions related to the respective channels by Fourier-transforming the respective impulse responses of the individual channel components.

6. A wireless communication device according to claim 5, wherein said channel separation unit changes over the Window function so as to use a Rectangular Window function if the reception quality is higher than a predetermined threshold value and to use a Window function having a low pass filter characteristic if the reception quality is lower than the predetermined threshold value.

7. A wireless communication device according to claim 6, wherein said quality measuring unit uses, as the reception quality, a signal-to-noise ratio obtained by use of the signal in the frequency domain, the pilot signal and the transfer function estimated by said first estimation unit.

8. A channel estimation and separation method in a wireless communication device including a receiving antenna receiving a plurality of signals transmitted from a plurality of transmitting antennas, said method comprising the steps of:

Fourier-transforming the plurality of signals received by the receiving antenna into signals in a frequency domain;

estimating a transfer function into which to multiplex transfer functions related to respective channels between each of the plurality of transmitting antennas and the receiving antenna on the basis of the transformed signals in the frequency domain and of a known pilot signal;

inverse-Fourier-transforming the estimated transform function into an impulse response in a time domain;

measuring a reception quality of the plurality of signals received by the receiving antenna;

separating the impulse response into impulse responses of individual channel components by use of a Window function changed over corresponding to the measured reception quality; and estimating the transfer functions related to the respective channels by Fourier-transforming the respective impulse responses of the individual channel components.

* * * * *